United States Patent
Li et al.

(10) Patent No.: US 12,032,465 B2
(45) Date of Patent: Jul. 9, 2024

(54) INTERPOLATING PERFORMANCE DATA

(71) Applicant: International Business Machines Corporation, Armonk, NY (US)

(72) Inventors: Zhi Li, Beijing (CN); Xing Xing Shen, Beijing (CN); Xiao Dong Li, Beijing (CN); He Jiang Jia, Beijing (CN); Sheng Jie BJ Han, Beijing (CN); Ye Tian, Dalian (CN); Bo Tong Liu, Beijing (CN); Peng Hui Jiang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 448 days.

(21) Appl. No.: 17/477,609

(22) Filed: Sep. 17, 2021

(65) Prior Publication Data

US 2023/0092253 A1 Mar. 23, 2023

(51) Int. Cl.
G06F 11/30 (2006.01)
G06F 11/34 (2006.01)
G06F 18/2413 (2023.01)

(52) U.S. Cl.
CPC ...... *G06F 11/3409* (2013.01); *G06F 11/3006* (2013.01); *G06F 11/3075* (2013.01); *G06F 11/3466* (2013.01); *G06F 18/24137* (2023.01)

(58) Field of Classification Search
CPC ............ G06F 11/3409; G06F 11/3006; G06F 11/3055; G06F 11/3072; G06F 11/3075;
(Continued)

(56) References Cited

U.S. PATENT DOCUMENTS 7,184,933 B2 2/2007 Prekeges et al.
8,265,875 B2 9/2012 Moore
(Continued)

FOREIGN PATENT DOCUMENTS

CN 104281494 A 1/2015
CN 108009016 A 5/2018
(Continued)

OTHER PUBLICATIONS

Deligiorgi et al., "Spatial Interpolation Methodologies in Urban Air Pollution Modeling: Application for the Greater Area of Metropolitan Athens, Greece," Advanced Air Pollution, Aug. 17, 2011, pp. 342-362.

*Primary Examiner* — Jeffrey P Aiello
(74) *Attorney, Agent, or Firm* — CANTOR COLBURN LLP; Teddi Maranzano

(57) ABSTRACT

Aspects of the invention include determining an event associated with a computing system, the event occurring at a first time, obtaining system data associated with the computing system, determining a system state of the computing system at the first time based on the system data, determining, based on the system state, two or more system data clusters comprising clustered system data associated with the system state of the computing system, determining, via an interpolation algorithm, an interpolated data value for the first time based on the system data, and adjusting the interpolated data value based on a determination that the interpolate data value is outside the two or more system data clusters.

25 Claims, 13 Drawing Sheets

(58) Field of Classification Search
CPC ............. G06F 11/3452; G06F 11/3466; G06F 11/008; G06F 17/17; G06F 17/18; G06F 18/15; G06F 18/23; G06F 18/24137; G06F 18/2414; G06F 18/21; G06F 18/2178; G06F 18/217; G06F 3/0418; G06F 2218/00; G06F 2218/08; G05B 23/0221; G05B 23/0283; G05B 19/41875
USPC ........ 700/109, 110, 108; 702/186, 182, 188, 702/189, 179, 81, 34, 57, 127, 183, 33, 702/85, 108; 703/2, 13; 709/224, 203, 709/223

See application file for complete search history.

(56) References Cited

U.S. PATENT DOCUMENTS

| | | |
|---|---|---|
| 10,713,073 B2 | 7/2020 | Liu et al. |
| 10,795,583 B2 | 10/2020 | Yang et al. |
| 2012/0221500 A1* | 8/2012 | Williamson ............ G06F 17/17 706/13 |
| 2019/0370677 A1 | 12/2019 | Garvey et al. |
| 2020/0031233 A1* | 1/2020 | Campbell ............... B60L 3/003 |
| 2020/0310847 A1* | 10/2020 | Schulze ................... H04L 67/10 |
| 2021/0142192 A1* | 5/2021 | Wang ........................ G06N 7/01 |
| 2022/0291930 A1* | 9/2022 | Litvinov ............. G06F 9/44505 |
| 2022/0383033 A1* | 12/2022 | Courtney ................ G06F 18/15 |
| 2023/0054784 A1* | 2/2023 | Malkan ............... G05B 19/4155 |

FOREIGN PATENT DOCUMENTS

| | | | | |
|---|---|---|---|---|
| CN | 112131212 A | 12/2020 | | |
| TW | 201908970 A | 3/2019 | | |
| WO | WO-2021171280 A1 * | 9/2021 | ......... | G06K 9/00342 |
| WO | WO-2021259372 A1 * | 12/2021 | ........... | H04B 17/318 |

* cited by examiner

INTERPOLATING PERFORMANCE DATA

BACKGROUND

The present invention generally relates to data management, and more specifically, to improved methods for interpolating performance data in a computing system.

The performance of computer systems varies over the course of their execution. As such, a system may perform well during some parts of its execution and then poorly during other times. To understand why a system behaves in such ways, performance analysts study the behavior over times. Most modern microprocessors support hardware performance monitors which enable the collection of time-varying performance metrics while the computer system is executing. However, even though these processors can collect hundreds of performance metrics, only a limited number can be collected simultaneously and only during established sampling times. Because of these limitations in the collection of performance data, various interpolation techniques can be utilized for determining performance metrics for time periods that performance data for a computing system was not collected. Cotemporary approaches use interpolation techniques such as arithmetic mean and linear regression in an attempt to interpolate performance metrics, however they are often not accurate due, for example to only taking into account sampled performance data.

SUMMARY

Embodiments of the present invention are directed to interpolating performance data in a computing system. A non-limiting example computer-implemented method includes determining an event associated with a computing system, the event occurring at a first time, obtaining system data associated with the computing system, determining a system state of the computing system at the first time based on the system data, determining, based on the system state, two or more system data clusters comprising clustered system data associated with the system state of the computing system, determining, via an interpolation algorithm, an interpolated data value for the first time based on the system data, and adjusting the interpolated data value based on a determination that the interpolate data value is outside the two or more system data clusters.

Embodiments of the present invention are directed to interpolating performance data in a computing system. A non-limiting example computer-implemented method includes determining system data associated with a computing system, wherein the system data comprises a plurality of performance metric values associated with the computing system taken at a plurality of time slices, generating, using a neural network model, performance robustness values for each of the plurality of performance metric values, plotting the performance robustness value for each of the plurality of performance metric values in a cartesian plane, clustering the performance robustness values into at least one system state for the computing system, and generating a data cluster for each of the at least one system states, wherein the data cluster is associated with a performance metric for the computing system.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provides systems and methods for improving interpolation of computing system data by incorporating the state of the computing system when performing the interpolation. The performance of computer systems varies over the course of their execution making collection of performance data that track performance metrics needed for addressing issues. Performance data is collected, typically, with hardware registers that sample the data according to a defined sampling rate. However, even though these processors can collect hundreds of performance metrics, only a limited number can be collected simultaneously and only during an established sampling rates. Because of these limitations in the collection of performance data, various interpolation techniques are utilized for determining performance metrics for time periods that performance data for a computing system was not collected.

Figure 1:
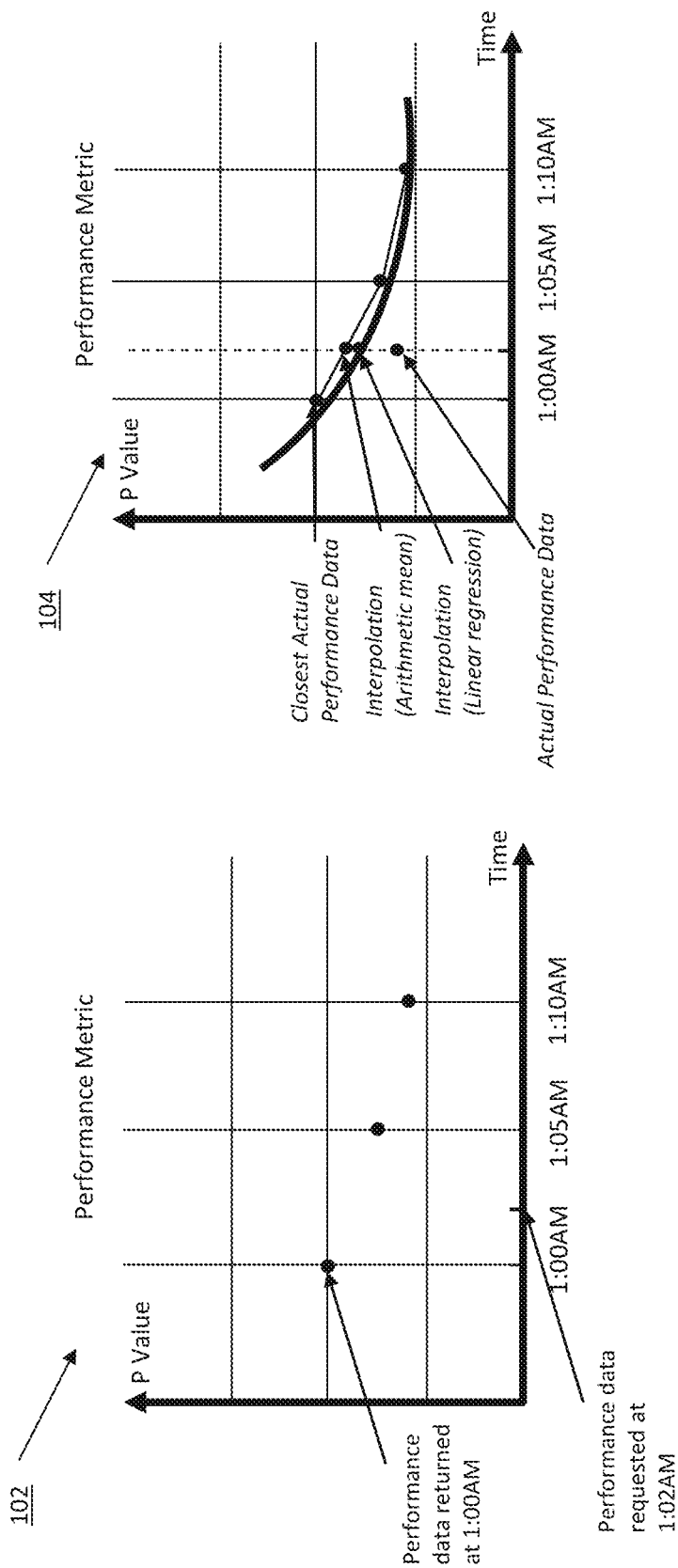
FIG. 1 depicts an exemplary graph depicting current interpolation techniques for estimating performance metrics in a computing system.

FIG. 1 depicts an exemplary graph depicting current interpolation techniques for estimating performance metrics in a computing system. The first graph 102 depicts how performance metric data is being sampled and shown in the graph with the performance metric value on the y-axis and the time on the x-axis. As shown in graph 102, the sampling of this performance metric occurs every five (5) minutes. In some cases, an event may have occurred in the computing system where there was not a performance metric value sampled and a computing engineer may want to determine the performance metric value. In the illustrated example, an event occurs at 1:02 am where two data points were collected at 1:00 am and 1:05 am. The second graph 104 illustrates two interpolation techniques (arithmetic mean and linear regression) used to interpolate a performance metric value for time 1:02 am. As shown in graph 104, the two interpolation techniques produce results that are not accurate as the two results are much higher than the actual performance data result.

As mentioned above, current interpolation techniques include arithmetic mean and/or linear regression. With arithmetic mean, two performance metric values are utilized for processing. And, with linear regression, more than four performance metric values are utilized for processing. However, these methods utilize only performance metric data that is in the same category (i.e., same performance metrics). For instance, to predict network input/output (IO) bandwidth, only historical IO bandwidth data is used for interpolation. For implementation in a real-world scenario, the network IO bandwidth can be affected by a variety of factors including, but not limited to, CPU utilization, priority of work, disk IO status, TCP connection numbers, and/or the like. These other categories of data can be analyzed to improve the interpolation of performance data.

Turning now to an overview of the aspects of the invention, one or more embodiments of the invention address the above-described shortcomings of the prior art by providing an interpolation methodology that takes into consideration the state of the computing system when performing the interpolation. The state of the computing system can include, but is not limited to, balanced resource, memory exhausted, high CPU, memory, and IO utilization, network IO competition, storage IO competition, and the like. Using historical performance metric data and clustering techniques, various data clusters can be determined for a system state in the computing system. Thus, when interpolating performance metric values, the state of the computing system can be determined and these data clusters can be utilized for confirming and/or adjusting the interpolated performance metric value to increase the accuracy.

Figure 2:
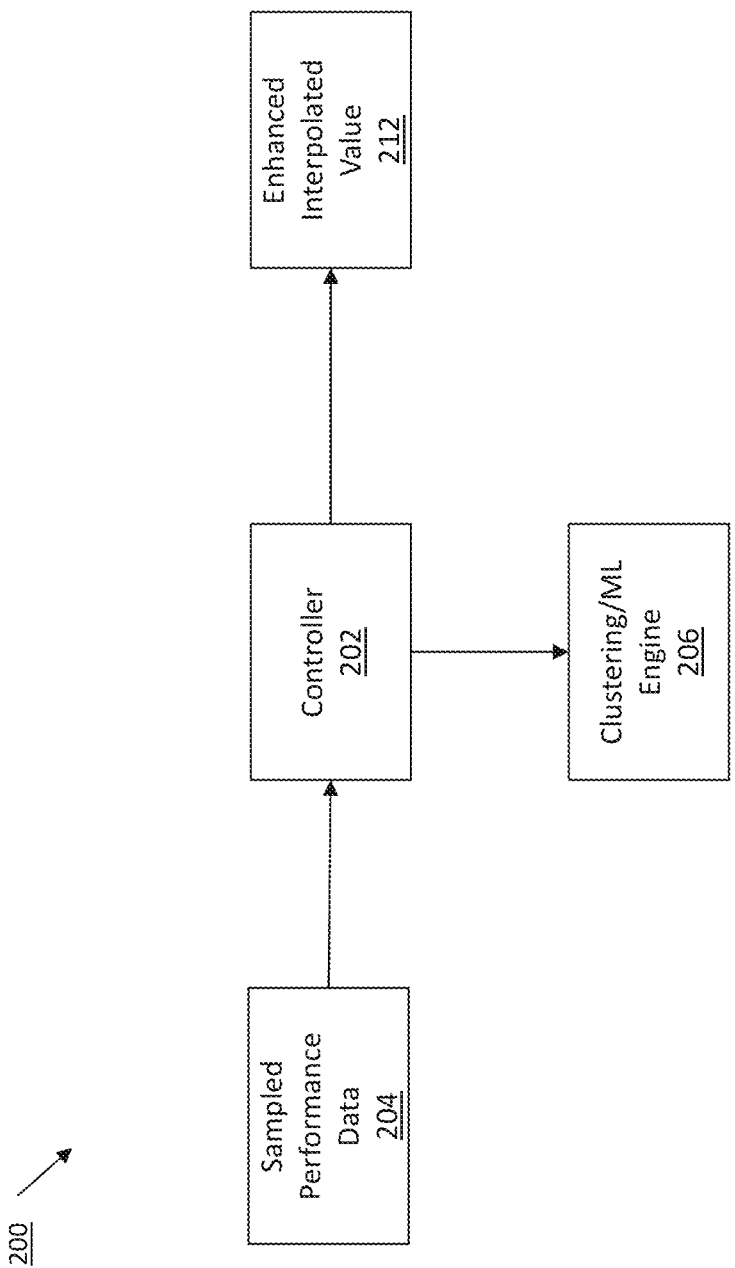
FIG. 2 depicts a system for interpolating performance metric values in a computing system according to one or more embodiments of the invention.

FIG. 2 depicts a system for interpolating performance metric values in a computing system according to one or more embodiments of the invention. The system 200 includes a controller 202 configured to receive sampled performance data 204 for a computing system. The system 200 also includes a clustering engine 206 that can be utilized by the controller 202 for processing the sampled performance data 204 allowing the controller 202 to output an adjusted interpolated value 212 for the performance data 204. In one or more embodiments of the invention, the sampled performance data 204 can be received by the controller 202. The controller 202 can utilize an interpolation algorithm to generate an interpolated value for a particular time. The interpolation algorithm can be arithmetic mean and/or linear regression algorithms, for example. The particular time for the interpolated value can be determined based on an event that occurs in the computing system where the performance data is being collected. The event can be, for example, a performance issue that occurred at a certain time. To address the performance issue, a snapshot of the performance metrics at the time would be needed thus the need for interpolation of performance metric values at the time of the event for this snapshot. As mentioned above, instead of using just interpolation algorithms alone, the controller 202 analyzes the state of the computing system to further adjust/enhance the interpolated value(s). By establishing the state of the computing system, the controller 202 can look to historical performance data values for specific performance metrics when determining whether to adjust the interpolated value. The historical performance data values can be arranged into data clusters, using the clustering engine 206. These data clusters allow for a comparison metric for determining if the interpolated performance value is accurate or needs to adjusted. For example, if the interpolated performance value falls within a data cluster for the state of the system, then the interpolation would be accurate and would not need to be adjusted. However, if the interpolated performance value falls outside the data cluster(s), then the interpolated performance value would need to be adjusted. In this case, the value can be moved to be within the data cluster and returned as an enhanced interpolated value 212 by the controller.

Figure 3:
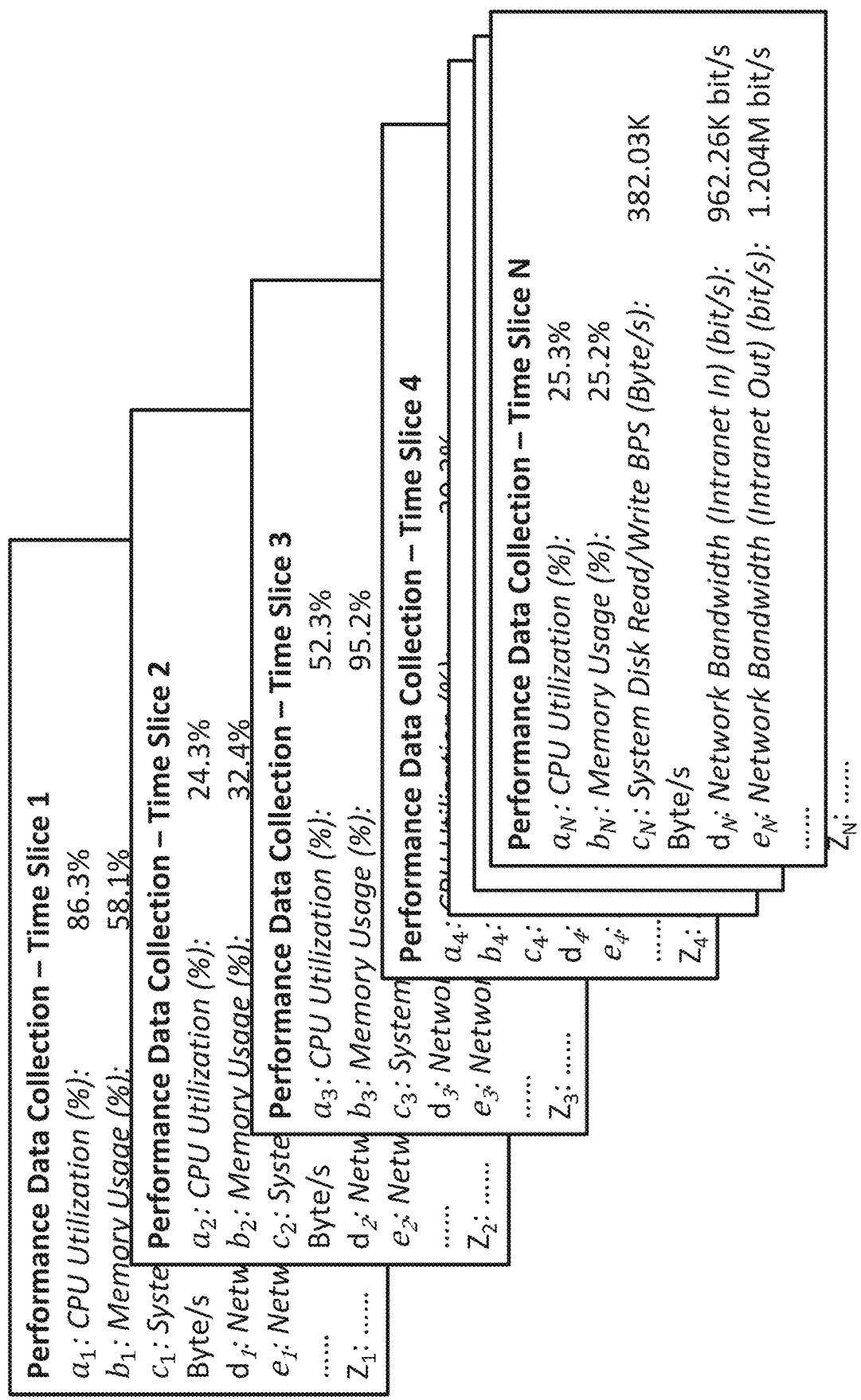
FIG. 3 depicts exemplary performance metrics collected during various time slices according to one or more embodiments of the invention.

In one or more embodiments of the invention, the clustering engine 206 utilizes one or more machine learning algorithms and/or neural networks to cluster the performance data. Performance data for all available performance categories (metrics) for a target system can be collected and utilized to train a machine learning model to quantify the system states of the computing system. FIG. 3 depicts exemplary performance metrics collected during various time slices according to one or more embodiments of the invention. In the illustrated example, the performance metrics collected include, but are not limited to, CPU utilization, memory usage, system disk read/write bytes per second, network bandwidth (intranet in), and network bandwidth (intranet out). These performance metrics data can be mapped to a specific system state and recorded for use with the interpolation methodology described herein. Data mass clusters can be generated for each performance category for each system state that is determined.

Figure 4:
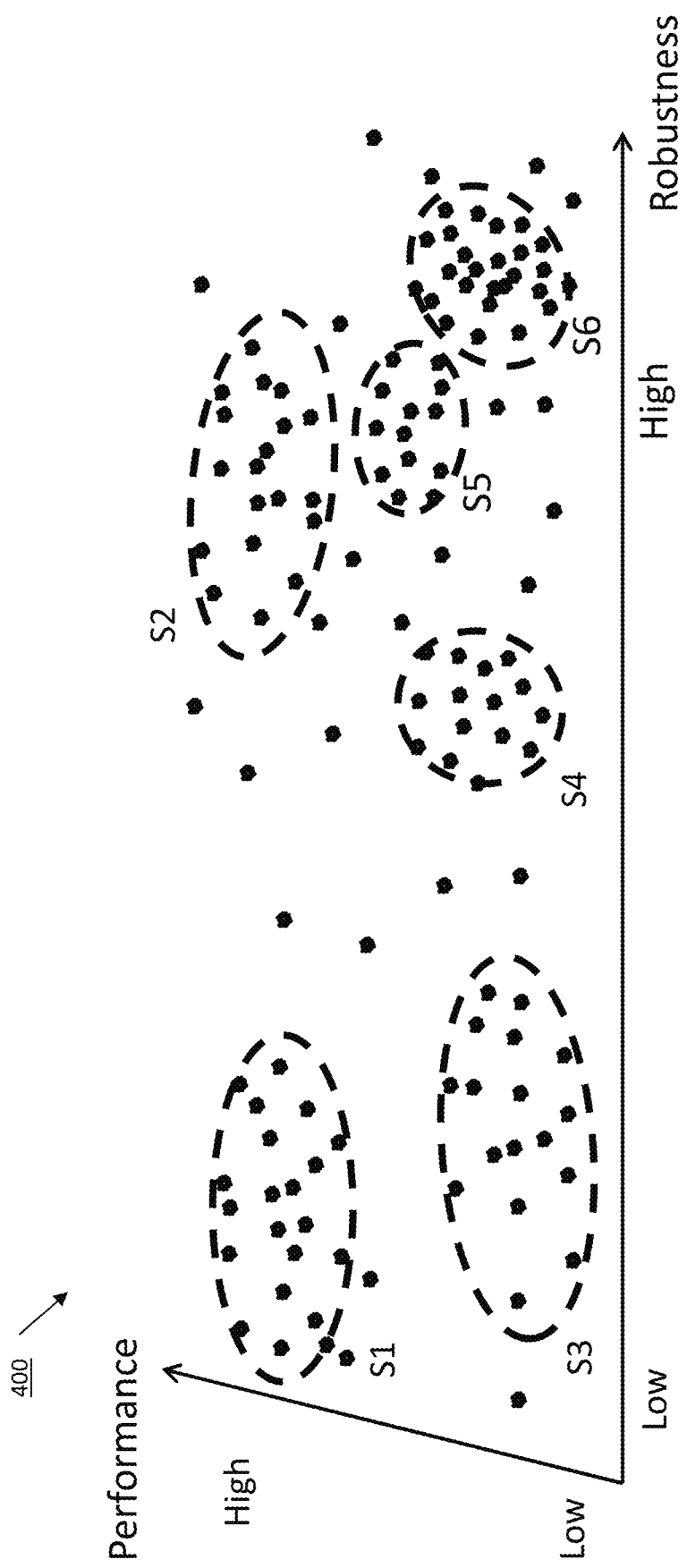
FIG. 4 depicts an exemplary performance data clustering in a cartesian plane according to one or more embodiments of the invention.

In one or more embodiments of the invention, the performance data for all time slices can be clustered into performance states on cartesian coordinates. FIG. 4 depicts an exemplary performance data clustering in a cartesian plane according to one or more embodiments of the invention. The cartesian plane 400 can, for example, have a y-axis showing performance of the computing system and an x-axis showing robustness of the computing system. These plotted performance metrics values can be weighted to create a performance robustness value using a neural network model. The performance and robustness of the input performance values can be calculated using a radial basis function (RBF)

model. An RBF network is a feedforward network the includes a input layer, a hidden layer, and an output layer. The RBF network generates values within a range of values for how low or how high of an influence each system data point has on both performance and robustness. For example, one system data point may have a low influence on performance, but a high influence on robustness. On the other hand, another system data point may have a high influence on performance, but a low influence on robustness. The performance and robustness data are plotted on these cartesian coordinated and clustered into performance (system) states (S1-S6) using a mean-shift algorithm. Some exemplary performance states include S1: high CPU, memory, and IO utilization, S2: balanced resource, S3: memory exhausted, S4: CPU competition, S5: network IO competition, and S6: storage IO competition. These descriptors are illustrative and not intended to limit the different types of performance states. Also, states can vary on different computing systems.

Figure 5:
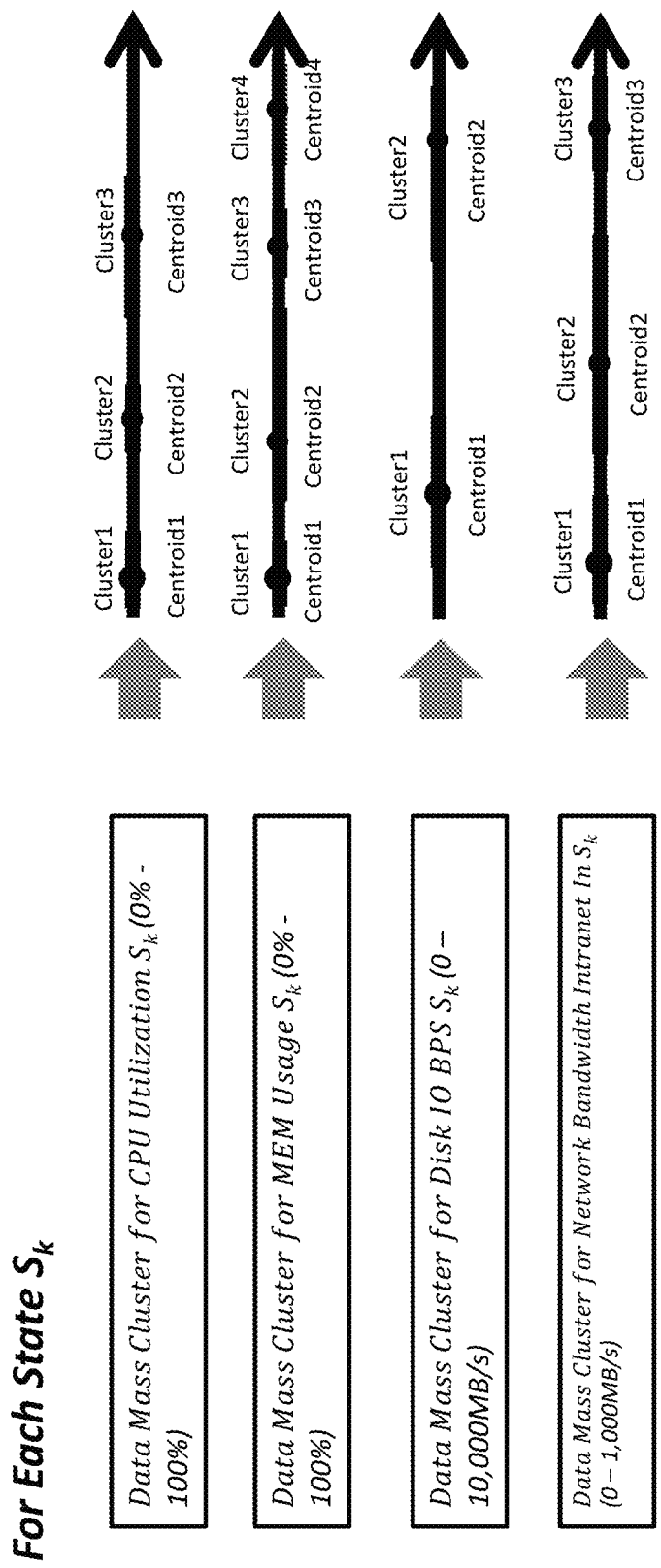
FIG. 5 depicts exemplary clusters for each performance category according to one or more embodiments of the invention.

In one or more embodiments of the invention, performance data mass clusters are crated for each performance category for each performance state. As the mapping for the raw performance data and the performance robustness data in the cartesian plane is recorded, historical performance data can be retrieved for a specific system state (e.g., S1). For S1, a collection of CPU utilization is obtained and placed into a one-dimensional array. A mean shift algorithm is used to cluster the original data values. This technique is a non-parametric clustering technique which does not require prior knowledge of the number of clusters. FIG. 5 depicts exemplary clusters for each performance category according to one or more embodiments of the invention. For each system state $S_k$, the performance values for each category are processed to create mass data clusters as shown in FIG. 5. For each cluster, a centroid value is calculated for use when determine both whether and how to adjust the interpolated performance data values.

Figure 6:
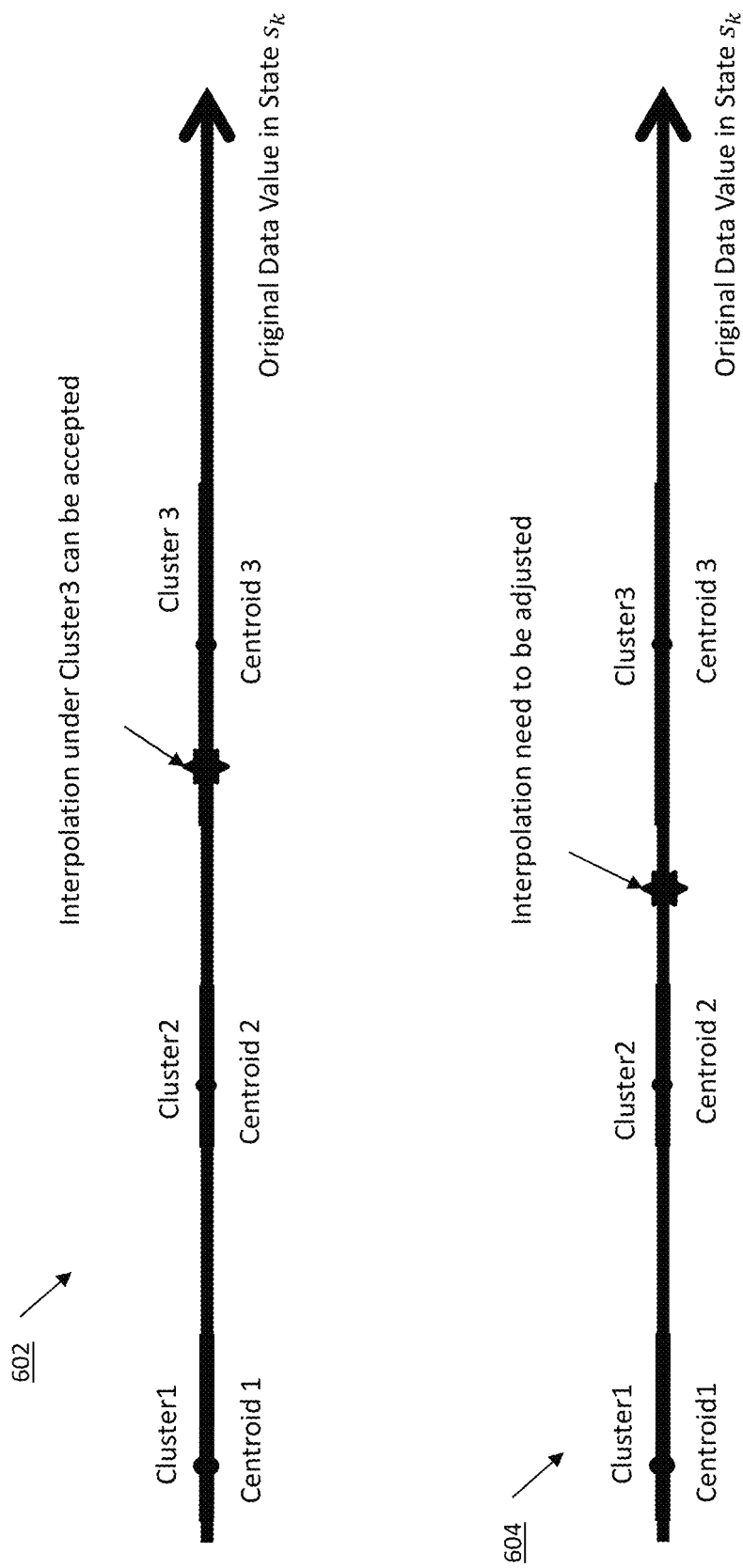
FIG. 6 depicts a plotting of an interpolated data value in a 1-dimensional array with data clusters according to one or more embodiments of the invention.
Figure 7:
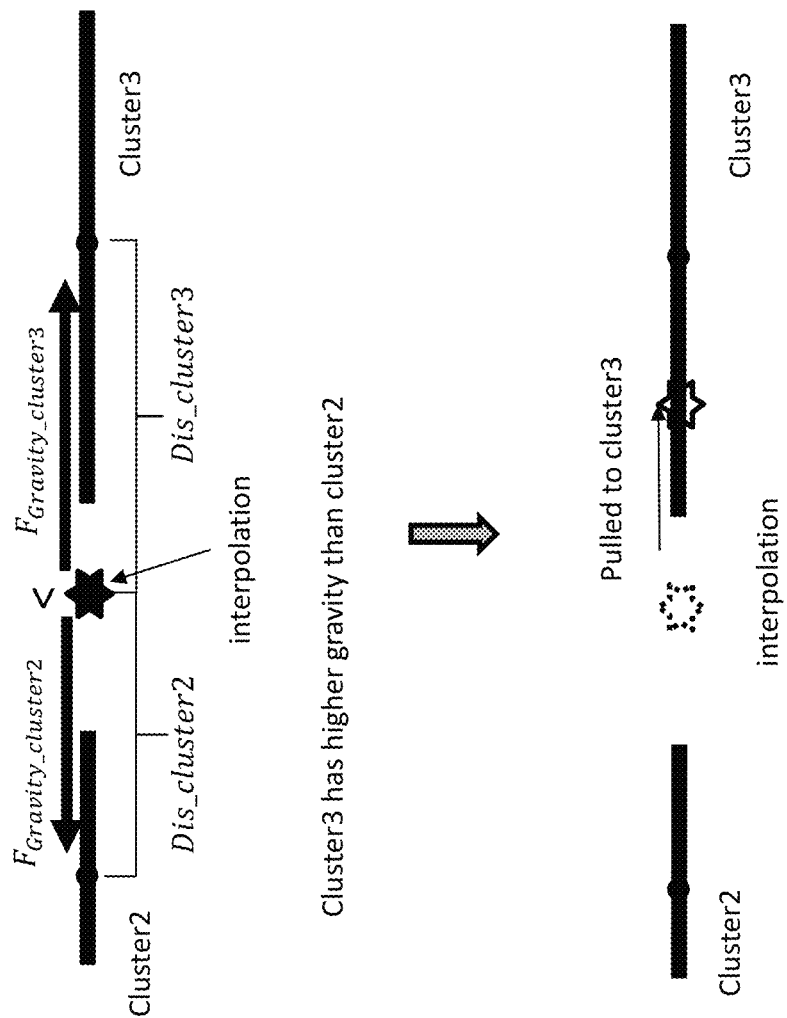
FIG. 7 depicts an exemplary methodology for determining which data cluster to adjust an interpolated value according to one or more embodiments.

In one or more embodiments of the invention, the controller 202 initially interpolates a performance metric value using the available data for the computing system for at a first time slice. The system state for the computing system is determined and data clusters are obtained related to the system state as described above. At this point, a determination is made as to whether or not to adjust the interpolated performance value based on these data clusters for the system state at the first time. FIG. 6 depicts a plotting of an interpolated data value in a 1-dimensional array with data clusters according to one or more embodiments of the invention. The 1-dimensional arrays show two cases. Case 602 shows an instance where the interpolated value falls within a data cluster (cluster 3) and there is no need to adjust the interpolated value. This indicates that based on the system state, the interpolation returned a value that was accurate according to the past historical data used to create these clusters. In case 604, there is an example of an interpolated value that would need to be adjusted because the interpolated value falls outside a data cluster in the array. Once it is determined that the interpolated value is outside a data cluster for the system state, the interpolated value is adjusted based on the data clusters present. FIG. 7 depicts an exemplary methodology for determining which data cluster to adjust an interpolated value according to one or more embodiments. The array includes cluster 2 and cluster 3 with the interpolated value falling in between these two data clusters. An exemplary calculation includes a gravitation calculation that includes equation [1].

$$F_{Gravity\_cluster} = \frac{N_{cluster}}{Dis\_cluster^2} \qquad \text{Equation [1]}$$

Figure 8:
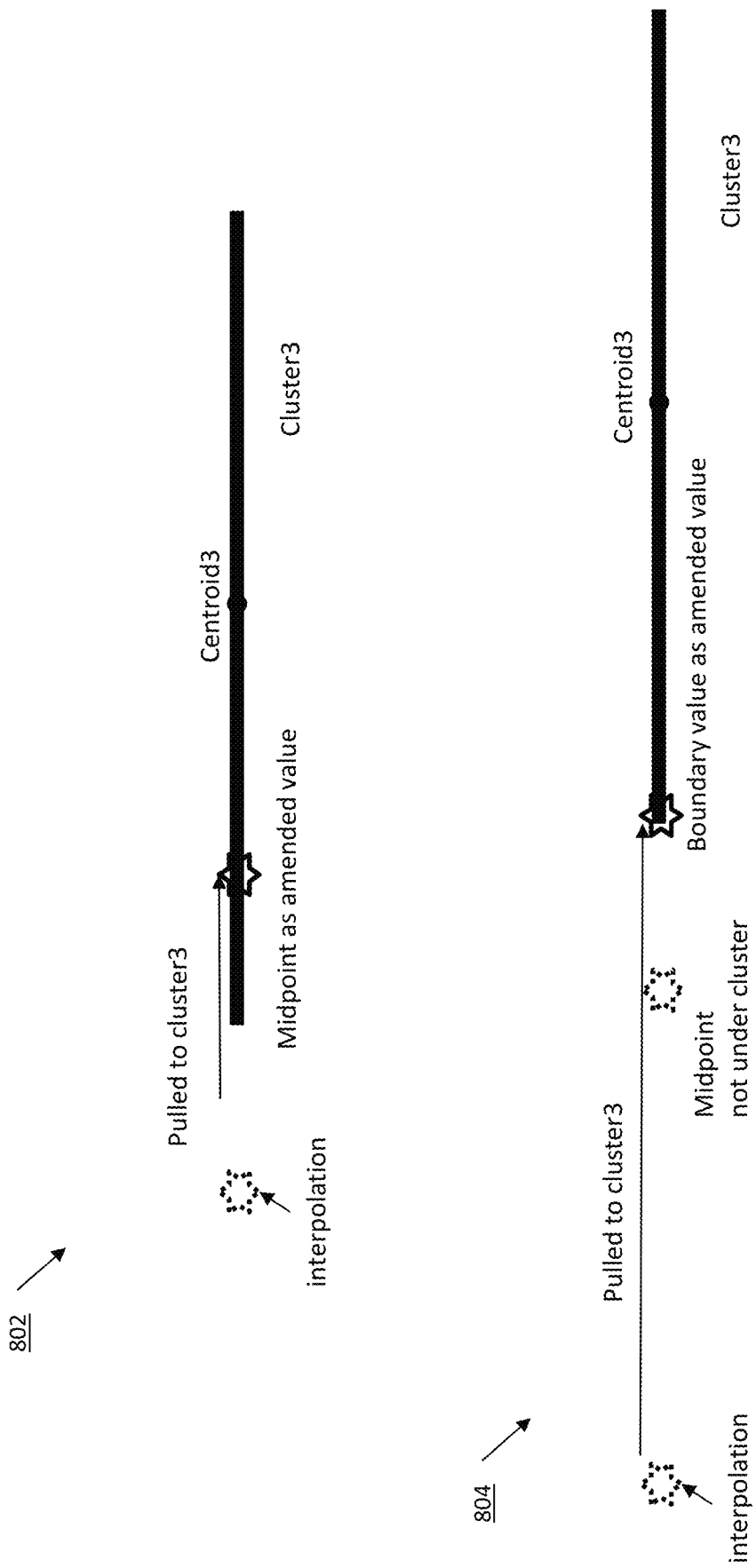
FIG. 8 depicts two scenarios for placement of the interpolated value within a data cluster according to one or more embodiments of the invention.

In equation [1], $F_{Gravity\_cluster}$ is the gravity from the cluster, $N_{cluster}$ is the number of points in the cluster, and Dis_cluster is the distance between the cluster centroid and the interpolated value. In FIG. 7, the initial interpolated value is located between cluster 2 and cluster 3 and a gravity value is calculated using equation [1], for example. The calculation results in cluster 3 gravitation being larger than the cluster 2 gravitation which indicates that the interpolated value is to be pulled to cluster 3 as shown. This represents that determination of which cluster to pull the interpolated value towards and may be sometimes referred to as the "nearest" cluster based on the gravitation calculation using a centroid of the data cluster. Once the "nearest" cluster is determined, the next decision would be to determine where to place the interpolated value within the "nearest" cluster. FIG. 8 depicts two scenarios for placement of the interpolated value within a data cluster according to one or more embodiments of the invention. In scenario 802, the midpoint between the interpolated value and the centroid of the cluster is calculated. The midpoint is within the data cluster (cluster 3) so the interpolated value is adjusted/amended to be the midpoint value and returned as the enhanced interpolated value. In scenario 804, the midpoint is still outside the data cluster. In this scenario, the interpolated value is then adjusted/amended to be a boundary value of the cluster and the boundary value is returned as the enhanced interpolated value.

Figure 12:
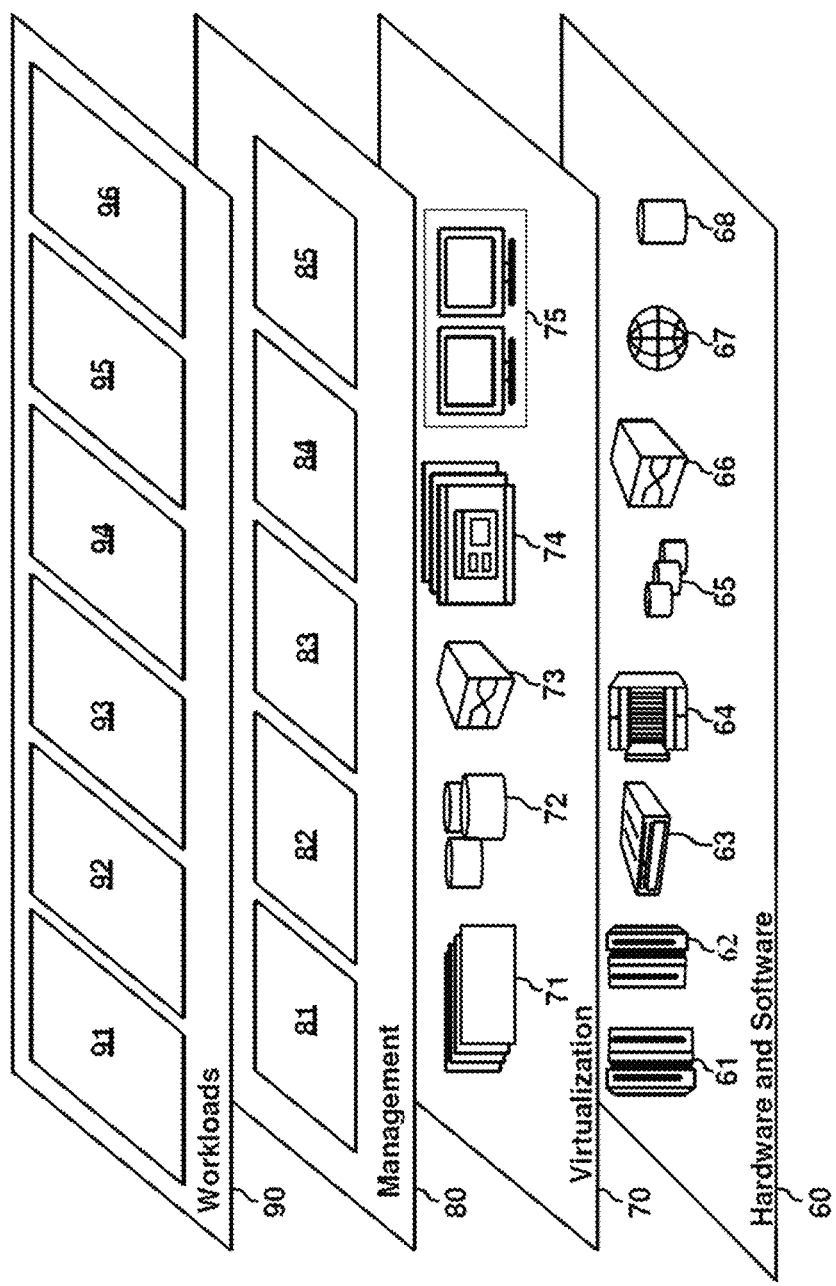
FIG. 12 depicts abstraction model layers according to one or more embodiments of the present invention.
Figure 13:
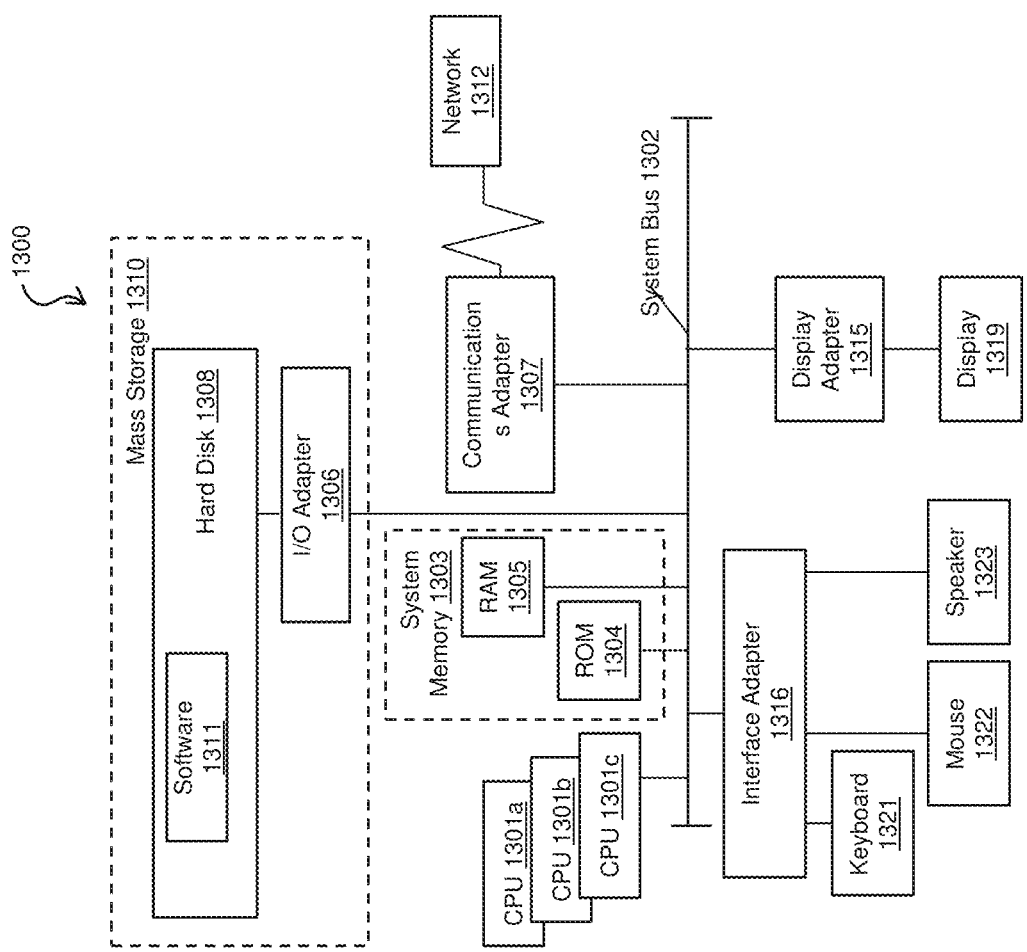
FIG. 13 depicts a computer system is generally shown in accordance with an embodiment.

In one or more embodiments of the invention, the controller 202 and any of the components on the system 200 can be implemented on the processing system 1300 found in FIG. 13. Additionally, the cloud computing system 50 can be in wired or wireless electronic communication with one or all of the elements of the system 200. Cloud 50 can supplement, support or replace some or all of the functionality of the elements of the system 200. Additionally, some or all of the functionality of the elements of system 200 can be implemented as a node 10 (shown in FIGS. 11 and 12) of cloud 50. Cloud computing node 10 is only one example of a suitable cloud computing node and is not intended to suggest any limitation as to the scope of use or functionality of embodiments of the invention described herein.

Figure 9:
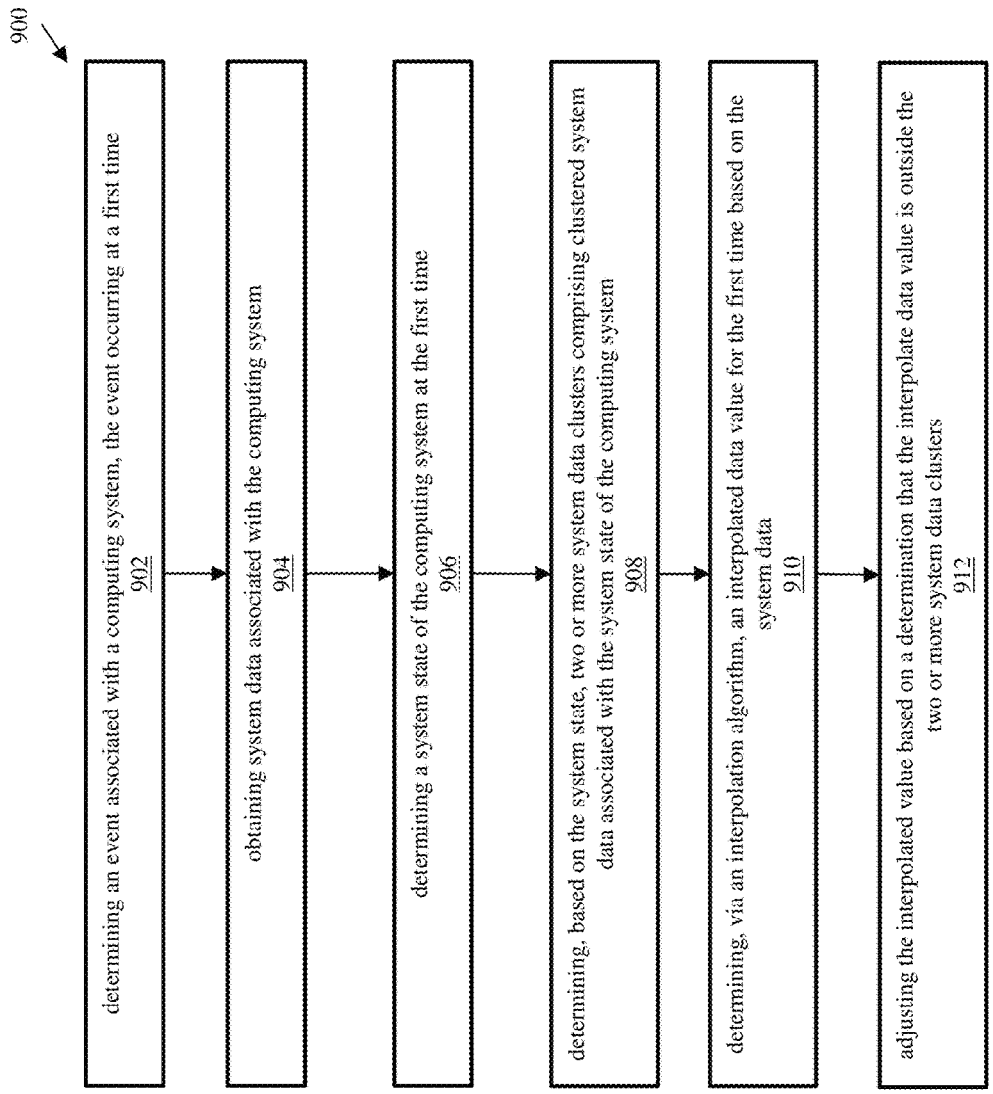
FIG. 9 depicts a flow diagram of a method 900 for interpolating performance data in computing system according to one or more embodiments of the invention.

FIG. 9 depicts a flow diagram of a method 900 for interpolating performance data in computing system according to one or more embodiments of the invention. At least a portion of the method 900 can be executed, for example, by the one or more processors 101 from FIG. 13. The method 900 includes determining an event associated with a computing system, the event occurring at a first time, as shown in block 902. At block 904, the method 900 includes obtaining system data associated with the computing system. The system data determines the system date wherein the method 900, at block 906, includes determining a system state of the computing system at the first time. Also, at block 908, the method 900 includes determining, based on the system state, two or more system data clusters comprising clustered system data associated with the system state of the computing system. The method 900 also includes determining, via an interpolation algorithm, an interpolated data value for the first time based on the system data, as shown at block 910. And at block 912, the method 900 includes adjusting the interpolated value based on a determination that the interpolate data value is outside the two or more system data clusters.

Additional processes may also be included. It should be understood that the processes depicted in FIG. 9 represent illustrations, and that other processes may be added or existing processes may be removed, modified, or rearranged without departing from the scope and spirit of the present disclosure.

Figure 10:
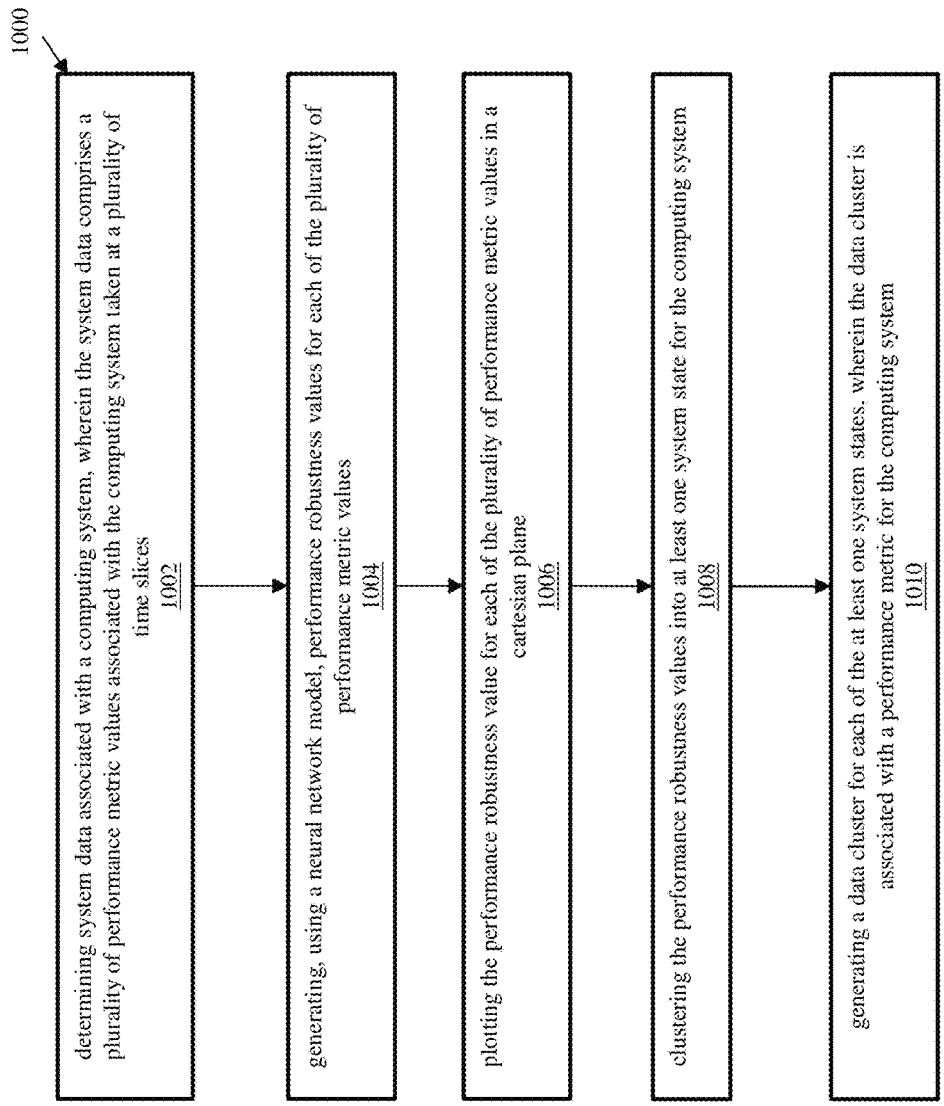
FIG. 10 depicts a flow diagram of a method 1000 for interpolating performance data in computing system according to one or more embodiments of the invention.

FIG. 10 depicts a flow diagram of a method 1000 for interpolating performance data in computing system according to one or more embodiments of the invention. At least a portion of the method 1000 can be executed, for example, by the one or more processors 101 from FIG. 13. The method 1000 includes determining system data associated with a computing system, wherein the system data comprises a plurality of performance metric values associated with the computing system taken at a plurality of time slices, as shown in block 1002. At block 1004, the method 1000 includes generating, using a neural network model, performance robustness values for each of the plurality of performance metric values. Also, at block 1006, the method 1000 includes plotting the performance robustness value for each of the plurality of performance metric values in a cartesian plane. At block 1008, the method 1000 includes clustering the performance robustness values into at least one system state for the computing system. And at block 1010, the method 1000 includes generating a data cluster for each of the at least one system states, wherein the data cluster is associated with a performance metric for the computing system.

Additional processes may also be included. It should be understood that the processes depicted in FIG. 10 represent illustrations, and that other processes may be added or existing processes may be removed, modified, or rearranged without departing from the scope and spirit of the present disclosure.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
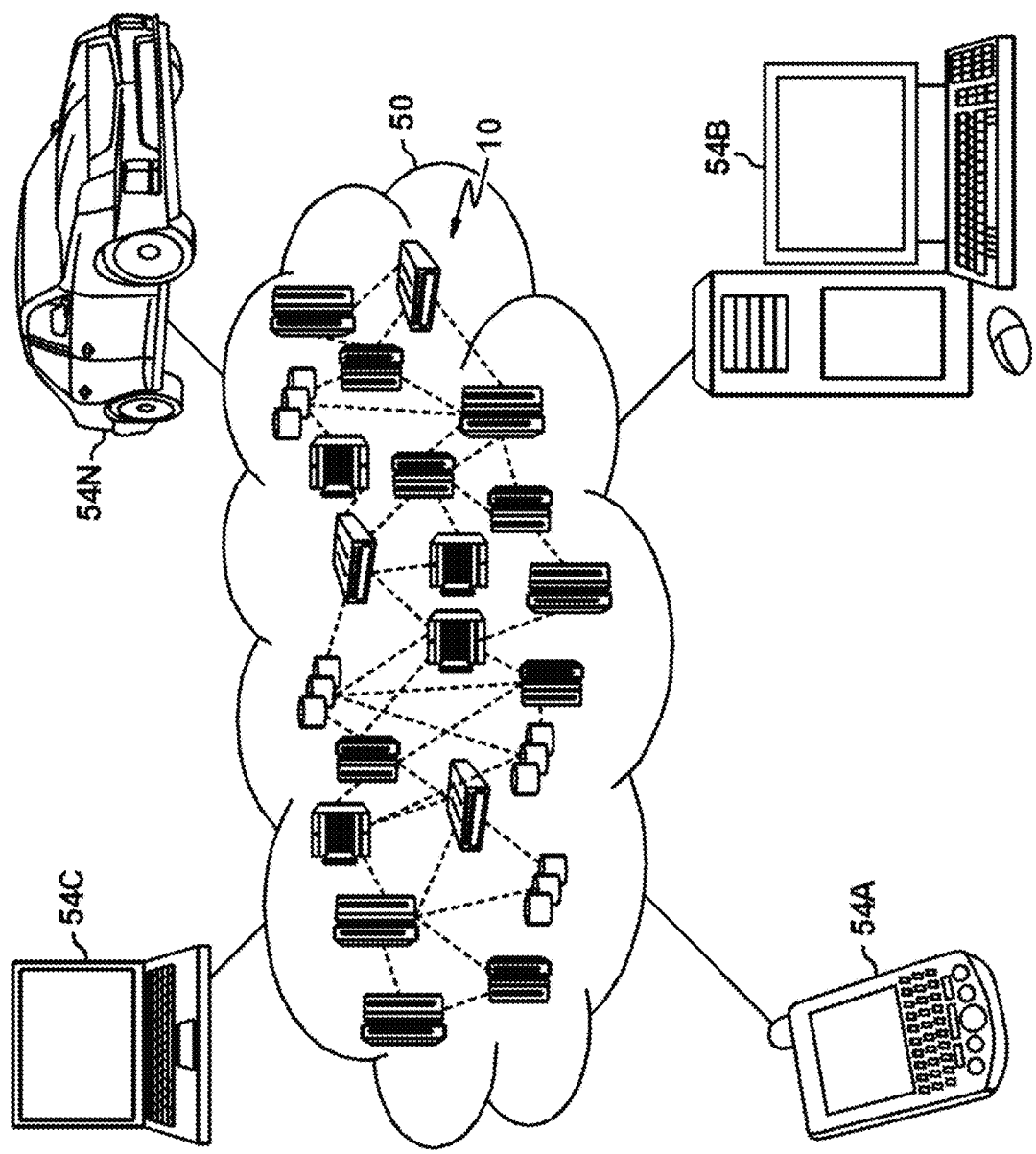
FIG. 11 depicts a cloud computing environment according to one or more embodiments of the present invention.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and interpolating performance data for a computing system 96.

Turning now to FIG. 13, a computer system 1300 is generally shown in accordance with an embodiment. The computer system 1300 can be an electronic, computer framework comprising and/or employing any number and combination of computing devices and networks utilizing various communication technologies, as described herein. The computer system 1300 can be easily scalable, extensible, and modular, with the ability to change to different services or reconfigure some features independently of others. The computer system 1300 may be, for example, a server, desktop computer, laptop computer, tablet computer, or smartphone. In some examples, computer system 1300 may be a cloud computing node. Computer system 1300 may be described in the general context of computer system executable instructions, such as program modules, being executed by a computer system. Generally, program modules may include routines, programs, objects, components, logic, data structures, and so on that perform particular tasks or implement particular abstract data types. Computer system 1300 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, the computer system 1300 has one or more central processing units (CPU(s)) 1301a, 1301b, 1301c, etc. (collectively or generically referred to as processor(s) 1301). The processors 1301 can be a single-core processor, multi-core processor, computing cluster, or any number of other configurations. The processors 1301, also referred to as processing circuits, are coupled via a system bus 1302 to a system memory 1303 and various other components. The system memory 1303 can include a read only memory (ROM) 1304 and a random access memory (RAM) 1305. The ROM 1304 is coupled to the system bus 1302 and may include a basic input/output system (BIOS), which controls certain basic functions of the computer system 1300. The RAM is read-write memory coupled to the system bus 1302 for use by the processors 1301. The system memory 1303 provides temporary memory space for operations of said instructions during operation. The system memory 1303 can include random access memory (RAM), read only memory, flash memory, or any other suitable memory systems.

The computer system 1300 comprises an input/output (I/O) adapter 1306 and a communications adapter 1307 coupled to the system bus 1302. The I/O adapter 1306 may be a small computer system interface (SCSI) adapter that communicates with a hard disk 1308 and/or any other similar component. The I/O adapter 1306 and the hard disk 1308 are collectively referred to herein as a mass storage 1310.

Software 1311 for execution on the computer system 1300 may be stored in the mass storage 1310. The mass storage 1310 is an example of a tangible storage medium readable by the processors 1301, where the software 1311 is stored as instructions for execution by the processors 1301 to cause the computer system 1300 to operate, such as is described herein below with respect to the various Figures. Examples of computer program product and the execution of such instruction is discussed herein in more detail. The communications adapter 1307 interconnects the system bus 1302 with a network 1312, which may be an outside network, enabling the computer system 1300 to communicate with other such systems. In one embodiment, a portion of the system memory 1303 and the mass storage 1310 collectively store an operating system, which may be any appropriate operating system, such as the z/OS or AIX operating system from IBM Corporation, to coordinate the functions of the various components shown in FIG. 13.

Additional input/output devices are shown as connected to the system bus 1302 via a display adapter 1315 and an interface adapter 1316 and. In one embodiment, the adapters 1306, 1307, 1315, and 1316 may be connected to one or more I/O buses that are connected to the system bus 1302 via an intermediate bus bridge (not shown). A display 1319 (e.g., a screen or a display monitor) is connected to the system bus 1302 by a display adapter 1315, which may include a graphics controller to improve the performance of graphics intensive applications and a video controller. A keyboard 1321, a mouse 1322, a speaker 1323, etc. can be interconnected to the system bus 1302 via the interface adapter 1316, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 13, the computer system 1300 includes processing capability in the form of the processors 1301, and, storage capability including the system memory 1303 and the mass storage 1310, input means such as the keyboard 1321 and the mouse 1322, and output capability including the speaker 1323 and the display 1319.

In some embodiments, the communications adapter 1307 can transmit data using any suitable interface or protocol, such as the internet small computer system interface, among others. The network 1312 may be a cellular network, a radio network, a wide area network (WAN), a local area network (LAN), or the Internet, among others. An external computing device may connect to the computer system 1300 through the network 1312. In some examples, an external computing device may be an external webserver or a cloud computing node.

It is to be understood that the block diagram of FIG. 13 is not intended to indicate that the computer system 1300 is to include all of the components shown in FIG. 13. Rather, the computer system 1300 can include any appropriate fewer or additional components not illustrated in FIG. 13 (e.g., additional memory components, embedded controllers, modules, additional network interfaces, etc.). Further, the embodiments described herein with respect to computer system 1300 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   determining an event associated with a computing system, the event occurring at a first time;
   obtaining, by a processor, system data associated with the computing system;
   determining, by the processor, a system state of the computing system at the first time based on the system data, wherein the system data comprises operational metrics specific to the computing system;
   determining, based on the system state, two or more system data clusters comprising clustered system data associated with the system state of the computing system, wherein the two or more system data clusters represent a range of operational states of the computing system;
   determining, via an interpolation algorithm, an interpolated data value for the first time based on the system data;
   adjusting the interpolated data value based on a determination that the interpolate data value is outside the two or more system data clusters; and
   adapting a system parameter of the computing system based on the adjusting the interpolated data value.

2. The computer-implemented method of claim 1, further comprising:
   returning the interpolated data value based on a determination that the interpolated data value is within at least one system data cluster in the two or more system data clusters.

3. The computer-implemented method of claim 1, wherein adjusting the interpolated data value comprises:
   determining a nearest system data cluster in the two or more system data clusters;
   determining a data value being midway between the interpolated data value and a centroid of the nearest system data cluster, wherein the data value is within the nearest system data cluster; and
   generating an adjusted interpolated data value comprising the data value midway between the interpolated performance data value and the centroid of the nearest performance data cluster.

4. The computer-implemented method of claim 1, wherein adjusting the interpolated data value comprises:
   determining a nearest system data cluster in the two or more system data clusters;
   determining a data value being midway between the interpolated data value and a centroid of the nearest system data cluster, wherein the data value is outside the nearest system data cluster; and
   generating an adjusted interpolated data value comprising a cluster border value for the nearest data cluster, wherein the cluster boarder value comprises a data value within the nearest data cluster and closest to the interpolated data value.

5. The computer-implemented method of claim 1, wherein determining, via an interpolation algorithm, an interpolated data value for the first time based on the system data comprises:
   determining a time segment comprising a length of time including the first time;
   determining system data values within the time segment; and
   performing, via the interpolation algorithm, an interpolation to determine the interpolated data value using the system data values within the time segment.

6. The computer-implemented method of claim 1, wherein determining, based on the system state, the two or more system data clusters comprises:
   analyzing historical system data comprising historical system data values and system state data;
   arranging, using a clustering algorithm, the historical system data values into two or more system data clusters; and
   assigning a system state to each of the two or more system data clusters.

7. The computer-implemented method of claim 1, wherein the interpolation algorithm comprises a linear regression algorithm.

8. A system comprising:
   a memory having computer readable instructions; and
   one or more processors for executing the computer readable instructions, the computer readable instructions controlling the one or more processors to perform operations comprising:
   determining an event associated with a computing system, the event occurring at a first time;
   obtaining system data associated with the computing system;
   determining a system state of the computing system at the first time based on the system data, wherein the system data comprises operational metrics specific to the computing system;

determining, based on the system state, two or more system data clusters comprising clustered system data associated with the system state of the computing system, wherein the two or more system data clusters represent a range of operational states of the computing system;

determining, via an interpolation algorithm, an interpolated data value for the first time based on the system data;

adjusting the interpolated data value based on a determination that the interpolate data value is outside the two or more system data clusters; and adapting a system parameter of the computing system based on the adjusting the interpolated data value.

9. The system of claim 1, wherein the operations further comprise:

returning the interpolated data value based on a determination that the interpolated data value is within at least one system data cluster in the two or more system data clusters.

10. The system of claim 8, wherein adjusting the interpolated value comprises:

determining a nearest system data cluster in the two or more system data clusters;

determining a data value being midway between the interpolated data value and a centroid of the nearest system data cluster, wherein the data value is within the nearest system data cluster; and generating an adjusted interpolated data value comprising the data value midway between the interpolated data value and the centroid of the nearest performance data cluster.

11. The system of claim 8, wherein adjusting the interpolated value comprises:

determining a nearest system data cluster in the two or more system data clusters;

determining a data value being midway between the interpolated data value and a centroid of the nearest system data cluster, wherein the data value is outside the nearest system data cluster; and generating an adjusted interpolated system data value comprising a cluster border value for the nearest data cluster, wherein the cluster boarder value comprises a data value within the nearest data cluster and closest to the interpolated data value.

12. The system of claim 8, wherein determining, via an interpolation algorithm, an interpolated data value for the first time based on the system data comprises:

determining a time segment comprising a length of time including the first time;

determining system data values within the time segment; and performing, via the interpolation algorithm, an interpolation to determine the interpolated data value using the system data values within the time segment.

13. The system of claim 8, wherein determining, based on the system state, the two or more system data clusters comprises:

analyzing historical system data comprising historical system data values and system state data;

arranging, using a clustering algorithm, the historical system data values into two or more system data clusters; and assigning a system state to each of the two or more system data clusters.

14. The system of claim 8, wherein the interpolation algorithm comprises a linear regression algorithm.

15. A non-transitory computer program product comprising a computer readable storage medium having program instructions embodied therewith, the program instructions executable by one or more processors to cause the one or more processors to perform operations comprising:

determining an event associated with a computing system, the event occurring at a first time;

obtaining system data associated with the computing system;

determining a system state of the computing system at the first time based on the system \ data, wherein the system data comprises operational metrics specific to the computing system;

determining, based on the system state, two or more system data clusters comprising clustered system data associated with the system state of the computing system, wherein the two or more system data clusters represent a range of operational states of the computing system;

determining, via an interpolation algorithm, an interpolated data value for the first time based on the system data;

adjusting the interpolated data value based on a determination that the interpolate data value is outside the two or more system data clusters; and adapting a system parameter of the computing system based on the adjusting the interpolated data value.

16. The non-transitory computer program product of claim 15, wherein the operations further comprise:

returning the interpolated data value based on a determination that the interpolated data value is within at least one system data cluster in the two or more system data clusters.

17. The non-transitory computer program product of claim 15, wherein adjusting the interpolated data value comprises:

determining a nearest system data cluster in the two or more system data clusters;

determining a data value being midway between the interpolated data value and a centroid of the nearest system data cluster, wherein the data value is within the nearest system data cluster; and generating an adjusted interpolated system data value comprising the data value midway between the interpolated data value and the centroid of the nearest performance data cluster.

18. The non-transitory computer program product of claim 15, wherein adjusting the interpolated data value comprises:

determining a nearest system data cluster in the two or more system data clusters;

determining a data value being midway between the interpolated data value and a centroid of the nearest system data cluster, wherein the data value is outside the nearest system data cluster; and generating an adjusted interpolated system data value comprising a cluster border value for the nearest data cluster, wherein the cluster boarder value comprises a data value within the nearest data cluster and closest to the interpolated data value.

19. The non-transitory computer program product of claim 15, wherein determining, via an interpolation algorithm, an interpolated data value for the first time based on the system data comprises:

determining a time segment comprising a length of time including the first time;

determining system data values within the time segment; and performing, via the interpolation algorithm, an interpolation to determine the interpolated value using the system data values within the time segment.

20. The non-transitory computer program product of claim 15, wherein determining, based on the system state, the two or more system data clusters comprises:

analyzing historical system data comprising historical system data values and system state data;

arranging, using a clustering algorithm, the historical system data values into two or more system data clusters; and assigning a system state to each of the two or more system data clusters.

21. A computer-implemented method comprising:

determining system data associated with a computing system, wherein the system data comprises a plurality of performance metric values associated with the computing system taken at a plurality of time slices;

generating, using a neural network model, performance robustness values for each of the plurality of performance metric values;

plotting the performance robustness value for each of the plurality of performance metric values in a cartesian plane;

clustering the performance robustness values into at least one system state for the computing system; and generating a data cluster for each of the at least one system states, wherein the data cluster is associated with a performance metric for the computing system.

22. The computer implemented method of claim 21, further comprising:

receiving a set of performance metric values for the computer system;

interpolating a first performance metric value from the set of performance metric values for a first time;

determining a system state for the computing system at the first time;

adjusting the first performance metric value based on a determination that the first performance metric value is outside a first data cluster associated with the system state.

23. The computer-implemented method of claim 22, further comprising:

returning the first performance metric value based on a determination that the first performance metric value is within a first data cluster associated with the system state.

24. A system comprising:

a memory having computer readable instructions; and one or more processors for executing the computer readable instructions, the computer readable instructions controlling the one or more processors to perform operations comprising:

determining system data associated with a computing system, wherein the system data comprises a plurality of performance metric values associated with the computing system taken at a plurality of time slices;

generating, using a neural network model, performance robustness values for each of the plurality of performance metric values;

plotting the performance robustness value for each of the plurality of performance metric values in a cartesian plane;

clustering the performance robustness values into at least one system state for the computing system; and generating a data cluster for each of the at least one system states, wherein the data cluster is associated with a performance metric for the computing system.

25. The system of claim 24, where the operations further comprise:

receiving a set of performance metric values for the computer system;

interpolating a first performance metric value from the set of performance metric values for a first time;

determining a system state for the computing system at the first time;

adjusting the first performance metric value based on a determination that the first performance metric value is outside a first data cluster associated with the system state.

* * * * *